Patented Apr. 22, 1952

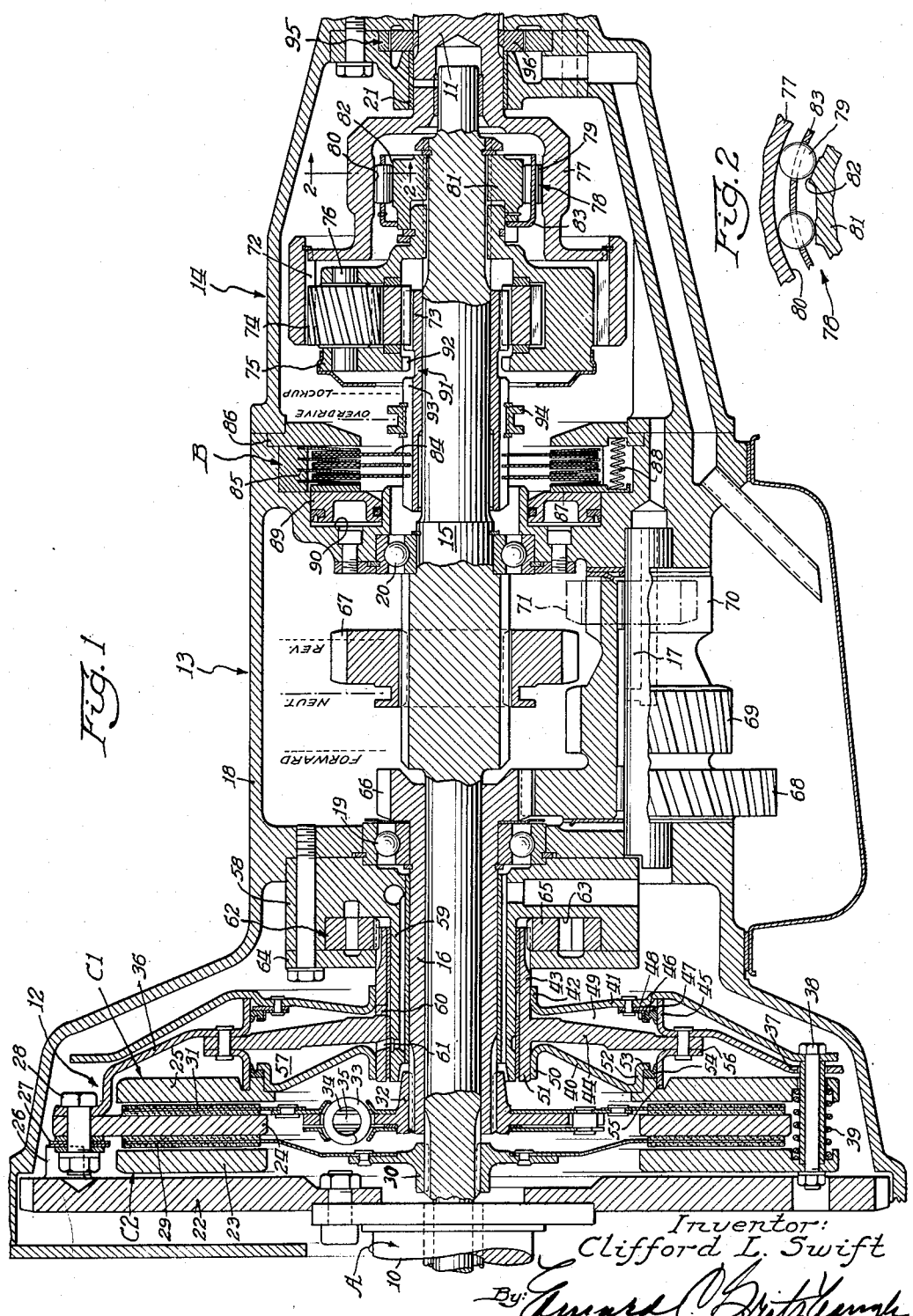

2,593,629

UNITED STATES PATENT OFFICE 2,593,629

FOUR-SPEED COUNTERSHAFT AND PLANETARY TRANSMISSION

Clifford L. Swift, Muncie, Ind., assignor to Borg-Warner Corporation, Chicago, Ill., a corporation of Illinois Application September 21, 1949, Serial No. 116,918

2 Claims. (Cl. 74—740)

1

My invention relates to transmissions and more particularly to transmissions for automotive vehicles.

It is an object of the invention to provide an improved transmission of this type affording four different forward speed ratios which utilize only three selectively operable engaging means for completing the speed ratios. It is contemplated that these engaging means shall preferably be of the friction type which may be engaged without any cessation of driving torque on the drive shaft of the transmission.

More particularly it is an object of the invention to provide a transmission of this type which comprises a countershaft type unit and a planetary type unit connected in series with each of the units being arranged to supply a plurality of speed ratios.

The invention consists of the novel constructions, arrangements and devices to be hereinafter described and claimed for carrying out the above stated objects and such other objects as will be apparent from the following description of a preferred embodiment of the invention illustrated with reference to the accompanying drawing, wherein:

Fig. 1 is a longitudinal, sectional view of a transmission embodying the principles of the invention; and Fig. 2 is a partial sectional view on an enlarged scale taken on line 2—2 of Fig. 1 in the direction indicated.

Like characters of reference designate like parts in the several views.

Referring now to the drawing, the illustrated transmission comprises a drive shaft 10 and a driven shaft 11. The shaft 10 is adapted to be connected to the engine of the vehicle in which the transmission is installed, and the shaft 11 is adapted to be connected with the driving road wheels of the vehicle by any suitable connections (not shown). The transmission comprises in general a hydraulic clutch assembly 12, a countershaft unit 13 and a planetary unit 14 which are connected in tandem between the shafts 10 and 11. The transmission comprises an intermediate shaft 15 piloted within the shafts 10 and 11, a sleeve shaft 16 rotatably disposed over the shaft 15, and a countershaft 17. A housing 18 is provided for the transmission, and the shafts 11, 15 and 16 are rotatably disposed within the housing by means of bearings 19 and 20 and bushing 21, and the countershaft 17 is fixed in the casing 18, as shown.

The clutch assembly 12 includes two friction

2 clutches C-1 and C-2 for respectively connecting the drive shaft 10 with the shafts 16 and 15. The clutch assembly comprises a flywheel 22 bolted to the shaft 10 and driving plates 23, 24 and 25. The flywheel is provided with a plurality of circumferentially spaced lugs 26, and each lug has secured thereto a plurality of flexible steel straps 27 connected to the driving plate 24 by bolt and nut assemblies 28. The clutch driving plate 24 is common to and may be considered as one of the driving members of either the clutch C-1 or the clutch C-2, and the driving plates 23 and 25 are connected to the plate 24 by parts hereafter to be described. The clutch C-2 comprises the driven plate 29 disposed between the plates 23 and 24 and having a hub 30 splined to the shaft 15. The clutch C-1 comprises a driven plate 31 having a hub 32 splined to the sleeve shaft 16. The driven plate 31 comprises a vibration dampener of an ordinary construction which comprises a plurality of springs 33 disposed in slots 34 and 35 provided in the plate 31 and in its hub 32 for cushioning the drive to the shaft 16.

The pressure plates 23 and 25 are connected to the flywheel 22 for rotation therewith by means of a dished sheet metal stamping or plate 36 provided with circumferentially spaced openings in its outer periphery for receiving the bolts of the bolt and nut assemblies 28, and the plate 36 is also provided with other circumferentially spaced openings indicated at 37 for receiving the bolts of bolt and nut assemblies 38. The bolts of the bolt and nut assemblies 38 extend through openings in the pressure plates 23 and 25 to connect the pressure plates with the stamping 36. A spring 39 is disposed on each of the bolts of the assemblies 38 and is operative to move the pressure plates out of engagement with the driven plates 29 and 31.

A fluid pressure operated piston 40 is provided for engaging the clutch C-1, and a fluid pressure operated piston 41 is provided for engaging the clutch C-2. The piston 41 is an annular stamping and has openings adjacent its outer periphery for receiving the bolts of the assemblies 38. The piston 41 on its inner periphery is provided with an axially formed portion 42 which is in sliding engagement with an axially extending hub portion 43 of an annular member 44. The stamping 36 is provided with an axially extending rim portion 45, and the piston 41 carries an annular seal 46 of yieldable material in contact with the inner face of the portion 45. The seal is fixed with respect to the piston 41 by means of an annular retainer washer 47 and an annular retaining ring 48 both riveted to the piston 41. The annular member 44, the axial portion 45 of the stamping 36 and the piston 41 define between them a pressure fluid chamber 49, which is adapted to receive fluid under pressure for the purpose of moving the piston 41.

The piston 40 has an axially extending portion 50 at its inner periphery in sliding contact with an axially extending sleeve portion 51 of the member 44. At its outer periphery, the piston is in contact with the pressure plate 25, as shown, and the piston is provided with an axially extending portion 52 and an outwardly extending tip 53. A seal 54 similar to the seal 46 is provided on the axial portion 52 and between the tip 53 and the plate 25, and the seal is in sliding contact with the inner surface of an axially extending portion 55 of a ring 56. The parts 36, 44 and 56 are riveted together so as to rotate together and with the flywheel 22. The parts 40, 44 and 56 form a fluid pressure chamber 57 for the piston 40, as is apparent.

A part 58 having a sleeve portion 59 is fixed to the casing 18 and is disposed over the shaft 16. The annular member 44 is rotatably disposed on the sleeve portion 59 which forms a bearing for the annular member 44. Passages 60 and 61 are formed in the parts 44 and 58, as shown, for supplying fluid under pressure to the chambers 49 and 57 for respectively actuating the pistons 41 and 40.

A pump 62 is provided in the part 58 fixed to the casing 18 and is disposed in a cavity 63 in the part 58 which is closed by an annular plate 64. The pump may be of any suitable construction and comprises a rotatable part 65 which, as shown, is splined to the sleeve portion 43 of the part 44. The pump 62 may be part of a fluid pressure system for supplying fluid pressure to the chambers 49 and 57 for engaging the clutches C-2 and C-1.

The countershaft unit 13 comprises a gear 66 formed on the end of the sleeve shaft 16 and a gear 67 splined on to the shaft 15. A gear cluster comprising gears 68, 69 and 70 is rotatably disposed on the countershaft 17, and an idler gear 71 is rotatably disposed on a suitable shaft (not shown) in the casing 18 in mesh with the gear 70. The arrangement of the gears is such that the gear 67 may be moved either into mesh with the gear 69 or with the gear 71, and any suitable mechanism (not shown) may be utilized for so moving the gear 67.

The planetary unit 14 comprises a ring gear 72, a sun gear 73, a plurality of planet gears 74 (one being shown in the drawing) in mesh with the sun and ring gears and a carrier 75 for the planet gears 74. The gears 74 are rotatably disposed on shafts 76 fixed in the carrier as shown. The sun gear 73 is rotatably disposed on the shaft 15; the carrier 75 is splined to the shaft 15; and the ring gear 72 is connected by a bell shaped shaft portion 77 with the driven shaft 11.

A one-way clutch 78 is provided between the shafts 15 and 11. The one-way clutch is of an ordinary construction and comprises rollers 79 disposed between an internal cylindrical surface 80 in the bell shaped shaft portion 77 and a hub 81 splined on to the shaft 15. The hub 81 is provided with a plurality of ramps 82, and the rollers 79 are adapted to engage between the ramps 82 and the surface 80 for engaging the clutch 78 to provide a forward direct drive between the shaft 15 and the shaft 11. A cage 83 is provided for holding the rollers 79 spaced at fixed distances from each other.

A friction brake B is provided for the sun gear 73 and comprises a plurality of friction discs 84 splined to the sun gear and a plurality of friction discs 85 splined and fixed with respect to the casing 18. The discs 84 and 85 are disposed between a fixed pressure plate 86 and a movable pressure plate 87. Springs 88 (one being shown in the drawing) are disposed between the pressure plates 86 and 87 for yieldably holding them apart. A fluid pressure piston 89 disposed in a cavity 90 in the casing 18 is provided for engaging the sun gear brake B.

A lockup clutch mechanism 91 is provided for locking together the carrier 75 and the sun gear 73. The clutch mechanism comprises clutch teeth 92 provided on the carrier 75 adapted to mesh with teeth 93 provided on the sun gear 73. The sun gear 73 is movable longitudinally of the shaft 15 so that the teeth 93 may be brought into mesh with the teeth 92 for engaging the clutch mechanism 91. The sun gear 73 is adapted to be moved axially by means of a grooved ring 94 splined and fixed axially with respect to the sun gear.

A second pump 95 or ordinary construction may be provided in addition to the pump 62 for the hydraulic system for controlling the transmission. The pump 95 has a driven rotatable part 96 which is splined to the driven shaft 11.

In operation, the illustrated transmission provides four forward speed ratios and a drive in reverse. The transmission is conditioned for forward drive by moving the gear 67 into mesh with the gear 69, and thereafter a low speed power train may be completed by engaging the friction clutch C-1. An intermediate speed power train may be subsequently completed by engaging the friction brake B allowing the clutch C-1 to remain in engagement. A direct drive power train may be subsequently completed by engaging the clutch C-2 and disengaging the brake B and clutch C-1. An overdrive power train may be completed by subsequently engaging the friction brake B allowing the clutch C-2 to remain engaged. A reverse power train may be completed through the transmission by moving the gear 67 into mesh with the idler gear 71 and engaging the lockup clutch 91 and thereafter engaging the clutch C-1.

The gear 67, as shown, has three principal positions, namely, neutral, forward and reverse positions. The gear 67 is moved into its forward position in engagement with the gear 69 for all forward speed drives through the transmission and is moved into its reverse position in engagement with the gear 71 for reverse drive through the transmission.

Assuming that the gear 67 is moved into its forward position in mesh with the gear 69, the clutch C-1 may be engaged for completing the low speed power train through the transmission by supplying fluid under pressure into the chamber 57 through the fluid passage 61. The fluid under pressure in the chamber 57 functions to move the piston 40 to the left as seen in the figure and move the pressure plate 25 in the same direction to engage the driven disc 31 between the pressure plates 24 and 25. This movement of the piston 40 and pressure plate 25 is against the action of the springs 39. A power train is thus completed from the drive shaft 10 through the flywheel 22, the lugs 26, the springs 27, the bolt and nut assemblies 28, the pressure plates 24 and 25, the driven friction plate 31, the vibration dampener including the springs 33, the hub 32, the sleeve shaft 16, the gears 66 and 68, gears 69 and 67, shaft 15, and one-way roller clutch 78 to the driven shaft 11. As is apparent from a previous description of the clutch assembly 12, the plates 24 and 25 are connected together by means of the stamping 36 and the bolt and nut assemblies 38 so that both are driven from the flywheel 22. The one-way clutch 78 is so constructed that when its hub 81 is driven in the forward direction (in the direction of the arrow A, which is the direction of rotation of the engine crankshaft), the rollers engage between the ramps 82 and the internal cylindrical surface 80 to complete a drive through the rollers to the driven shaft 11.

For intermediate speed drive, the friction brake B is subsequently engaged, allowing the clutch C–1 to remain in engagement. The brake B is engaged by supplying fluid under pressure behind the piston 89 to force the pressure plate 87 toward the pressure plate 86 and thereby engage the interleaved discs 84 and 85. The brake B is effective to hold the sun gear 73 stationary against rotation. It is assumed that the sun gear 73 is in its position axial of the shaft 15 in which it is illustrated with the clutch 91 disengaged. The carrier 75 is splined to the shaft 15 as previously described and when the sun gear 73 is thus held stationary, the planet gears 74 planetate about the sun gear and drive the ring gear 72 at an overdrive with respect to the shaft 15. The power train in intermediate speed ratio is the same as in low speed ratio except that it is through the gear set 14 instead of the one-way clutch 80. As shown, the gears 66 and 69 are smaller than the gears 68 and 67 with which they respectively mesh, and the overall speed ratio through the gear set 13 is an underdrive, and the gears are so proportioned that the underdrive is greater than the overdrive produced through the planetary gear set 14, so that the overall speed ratio between the shafts 10 and 11 is an underdrive and is intermediate between the low speed ratio and a direct drive.

Third speed forward drive, which is a direct drive, is obtained by engaging the clutch C–2 and disengaging the clutch C–1 and the brake B. The clutch C–2 is engaged by providing fluid under pressure within the chamber 49 through the passage 69 which functions to move the piston 41 to the right as seen in the drawing. This movement of the piston, through the bolt and nut assemblies 38, moves the pressure plate 23 toward the pressure plate 24 to engage the friction disc 29 therebetween. The power train through the transmission is then from the shaft 10 through the flywheel 22, the lugs 26, the springs 27, the bolt and nut assemblies 28, the pressure plates 23 and 24, the clutch disc 29, the shaft 15 and the roller clutch 78 to the driven shaft 11. The plate 23 is connected with the plate 24 in the same manner that the plate 25 is connected to rotate with the plate 24, so that the plates 23 and 24 rotate at all times with the flywheel 22 and the shaft 10.

Fourth speed forward drive, which is an overdrive, is subsequently completed by engaging the brake B allowing the clutch C–2 to remain engaged. The power train in this case is the same as in third speed drive except that the power flows through the planetary gear set 14 in lieu of the one-way clutch 78.

The clutch 91 may be utilized for locking up the planetary gear set 14 and the one-way clutch 78, so that all of the parts of these two units rotate together in a two-way drive. The clutch 91, when engaged by axial movement of the sun gear 73 to the right to engage the teeth 92 and 93, couples together the sun gear 73 and the carrier 75, and the ring gear 72 and the driven shaft 11 is thereby driven in a two-way drive from the shaft 15. Since the clutch 78 is connected between the portion 77 of the shaft 11 and the shaft 15, the clutch 78 is also locked up so that there is a two-way drive between its driving and driven parts, namely the hub 81 and the shaft portion 77. The clutch 91 may thus be utilized for locking up the clutch 78 whenever the clutch is utilized in the drive, namely, as above described, in low and direct speed ratios, and each of the power trains for these speed ratios will thus be converted from one-way drive power trains to two-way drive power trains.

Reverse drive is obtained through the transmission by first moving the gear 67 into mesh with the idler gear 71 and engaging the clutch 91 and then engaging the friction clutch C–1. The drive in this case is from the drive shaft 10 through the flywheel 22 to the lugs 26, springs 27, pressure plates 24 and 25, clutch disc 31, the vibration dampener including the springs 33, the hub 32, shaft 16, gears 66, 68, 70, 71 and 67, shaft 15, the planetary gear set comprising the gears 73, 74 and 72 to the driven shaft 11. The idler gear 71 utilized for this drive is effective to cause the gear 67 and thereby the shaft 15 to rotate in the reverse direction, that is, oppositely with respect to the direction of rotation indicated by the arrow A. The clutch 91 when engaged functions to lock up the planetary gear set comprising the gears 73, 74 and 72 to provide a two-way drive between the shafts 15 and 11 as has been described, and this reverse rotation of the shaft 15 is thus transmitted to the shaft 11 for driving the latter shaft in the reverse direction.

My transmission advantageously is simple in construction and economical to manufacture, considering the number of speed ratios that are supplied by the transmission. The transmission may be expected to require controls of minimum complication, in view of the fact that only three engaging means, namely the clutches C–2, C–1 and the brake B are required for finally completing the four forward speed power trains through the transmission. It will be noted that each of these engaging means is of the friction type, so that the transmission may be power shifted, that is, shifted while torque is being supplied from the driving engine of the vehicle to the drive shaft 10, and without any cessation of torque being necessary for completing the different speed ratios.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a transmission; the combination of a drive shaft; a driven shaft; a countershaft type gear unit having first and second input shafts, a gear fixed to said first input shaft, a countershaft gear cluster having a gear in mesh with said first-named gear, said second input shaft extending through said countershaft unit so as to constitute the output shaft for providing a direct forward drive through the countershaft unit, said second input shaft having a gear splined on and movable on it, said gear cluster including two other gears with one of which said movable gear is adapted to mesh for completing a low forward speed drive through the countershaft unit, and an idler gear in mesh with the third of said cluster gears and adapted to be meshed by said movable gear for completing a reverse drive through the countershaft gear unit; a friction clutch for connecting each of said input shafts respectively with said drive shaft; a planetary gear set comprising sun and ring gears and a planet gear in mesh with the sun and ring gears and a planet gear carrier, said carrier being connected with said second input shaft so as to be driven by said countershaft gear unit and said ring gear being connected with said driven shaft for driving the driven shaft; a friction brake for said sun gear for completing an overdrive forward drive through the planetary gear set; a one-way clutch between said second input shaft and said driven shaft for providing a one-way direct forward drive between the second input and driven shafts; a lockup clutch for locking together two elements of said planetary gear set to provide a two-way direct drive through the planetary gear set; and fluid pressure operated pistons for engaging said friction brake and both of said friction clutches respectively; whereby engagement of said lockup clutch and completion of said reverse drive through said countershaft gear unit complete a reverse drive ratio through said transmission, whereby alternate completion of said direct forward drive and said overdrive forward drive through said planetary gear set while said low speed forward drive is completed through said countershaft gear unit provides respectively a first speed forward drive ratio and a second speed forward drive ratio through said transmission, and whereby alternate completion of said direct forward drive and said overdrive forward drive through said planetary gear set while said direct forward drive is completed through said countershaft gear unit provides respectively a direct forward drive ratio and an overdrive forward drive ratio through said transmission, said friction clutches and brake and said one-way clutch enabling completion of any one of said forward drive ratios during the operation of any other forward drive ratio.

2. In a transmission, the combination of a drive shaft, a driven shaft, a countershaft gear set, a planetary gear set in tandem with said countershaft gear set and drivingly connected with said driven shaft, a first input shaft for said countershaft gear set, a second input shaft for said countershaft gear set, said second input shaft also functioning as an input shaft for said planetary gear set, a pair of selectively operable friction clutches for respectively coupling said first input shaft or said second input shaft to said drive shaft to thereby complete either a reduced forward drive or a direct forward drive power train through said countershaft gear set to said planetary input shaft, a one-way engaging device for completing a direct forward drive power train between said second input shaft and said driven shaft, and a friction brake for braking an element of said planetary gear set for completing an overdrive forward power train between said second input shaft and said driven shaft, whereby four forward speed drive ratios may be completed through said transmission by alternate completion of said direct forward drive power train and said overdrive forward power train through said planetary gear set while said reduced forward drive power train and said direct forward drive power train are alternately completed through said countershaft gear set, whereby said four forward speed drive ratios are completed through said transmission by selective engagement of only said two friction clutches and said single friction brake, and whereby any one of said four forward speed drive ratios can be completed during the operation of any other forward drive ratio.

CLIFFORD L. SWIFT.

REFERENCES CITED

The following references are of record in the file of this patent:

UNITED STATES PATENTS

| Number | Name | Date |
|---|---|---|
| 1,931,241 | Tibbetts | Oct. 17, 1933 |
| 2,113,088 | Jonsson | Apr. 5, 1938 |
| 2,185,538 | Burtnett | Jan. 2, 1940 |
| 2,202,378 | Hertrich | May 28, 1940 |
| 2,238,746 | Neracher et al. | Apr. 15, 1941 |
| 2,247,478 | Burtnett | July 1, 1941 |
| 2,254,335 | Vincent | Sept. 2, 1941 |
| 2,323,340 | McFarland | July 6, 1943 |
| 2,348,424 | Shorter | May 9, 1944 |
| 2,440,589 | Kegresse | Apr. 27, 1948 |
| 2,485,688 | Banker | Oct. 25, 1949 |